United States Patent
Schunk (10) Patent No.: US 8,452,189 B2
(45) Date of Patent: May 28, 2013

(54) SOURCE-MULTIPLEXED PULSE AMPLITUDE MODULATION (PAM) OPTICAL DATA COMMUNICATION SYSTEM AND METHOD

(75) Inventor: Nikolaus W. Schunk, Maxhuette-Haidhof (DE)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 319 days.

(21) Appl. No.: 13/009,452

(22) Filed: Jan. 19, 2011

(65) Prior Publication Data

US 2012/0183290 A1 Jul. 19, 2012

(51) Int. Cl.
*H04B 10/04* (2006.01)
*H04B 10/12* (2006.01)

(52) U.S. Cl.
USPC .......................................... 398/189; 398/201

(58) Field of Classification Search
USPC .................... 398/189–191, 200, 201
See application file for complete search history.

(56) References Cited

U.S. PATENT DOCUMENTS

| | | | |
|---|---|---|---|
| 7,308,058 B2 | 12/2007 | Zerbe et al. | |
| 7,311,450 B2* | 12/2007 | Kim et al. | 385/89 |
| 2001/0035997 A1 | 11/2001 | Agazzi | |
| 2002/0181063 A1* | 12/2002 | Kropp | 359/180 |
| 2003/0152154 A1 | 8/2003 | Johnson | |
| 2010/0060972 A1 | 3/2010 | Kucharski et al. | |
| 2010/0111525 A1* | 5/2010 | Ford | 398/43 |
| 2010/0316388 A1* | 12/2010 | Shastri et al. | 398/115 |
| 2011/0129231 A1* | 6/2011 | Fiorentino et al. | 398/141 |

FOREIGN PATENT DOCUMENTS

EP 0924907 A2 6/1999

OTHER PUBLICATIONS

T. Whitaker, "Closed-Loop Electronic Controllers Drive LED Systems," LEDs Magazine, Jun. 2006. Retrieved from the Internet <URL: http://www.ledsmagazine.com/features/3/1/4>.

* cited by examiner

*Primary Examiner* — Nathan Curs (57) ABSTRACT

An optical signal representing digital data is produced by an opto-electronic semiconductor device having a group of three or more opto-electronic light sources that emit optical signals in accordance with a pulse amplitude modulation (PAM) scheme. The optical signal can be transmitted through an optical fiber coupled to an assembly containing the opto-electronic semiconductor device.

24 Claims, 9 Drawing Sheets

| Dn, Dn+1 | LED 28 | LED 30 | LED 32 |
|---|---|---|---|
| 11 | 1 | 1 | 1 |
| 10 | 1 | 0 | 1 |
| 01 | 0 | 1 | 0 |
| 00 | 0 | 0 | 0 |

| Dn, Dn+1, Dn+2 | LED 56 | LED 58 | LED 60 | LED 62 |
|---|---|---|---|---|
| 111 | 2 | 2 | 2 | 1 |
| 110 | 2 | 2 | 1 | 1 |
| 101 | 1 | 1 | 1 | 2 |
| 100 | 1 | 1 | 1 | 1 |
| 011 | 1 | 1 | 0 | 1 |
| 010 | 1 | 0 | 1 | 0 |
| 001 | 0 | 1 | 0 | 0 |
| 000 | 0 | 0 | 0 | 0 |

| Dn, Dn+1, Dn+2 | LED 92 | LED 94 | LED 96 |
|---|---|---|---|
| 111 | 2-1/3 | 2-1/3 | 2-1/3 |
| 110 | 2 | 2 | 2 |
| 101 | 2 | 1 | 2 |
| 100 | 1 | 2 | 1 |
| 011 | 1 | 1 | 1 |
| 010 | 1 | 0 | 1 |
| 001 | 0 | 1 | 0 |
| 000 | 0 | 0 | 0 |

| Dn, Dn+1, Dn+2 | LED 126 | LED 128 | LED 130 | LED 132 | LED 134 | LED 136 | LED 136 |
|---|---|---|---|---|---|---|---|
| 111 | 1 | 1 | 1 | 1 | 1 | 1 | 1 |
| 110 | 1 | 0 | 1 | 1 | 1 | 1 | 1 |
| 101 | 0 | 1 | 1 | 1 | 1 | 0 | 1 |
| 100 | 1 | 1 | 0 | 0 | 1 | 1 | 0 |
| 011 | 1 | 0 | 1 | 1 | 0 | 0 | 0 |
| 010 | 0 | 1 | 0 | 0 | 0 | 0 | 1 |
| 001 | 0 | 0 | 0 | 0 | 0 | 1 | 0 |
| 000 | 0 | 0 | 0 | 0 | 0 | 0 | 0 |

FIG. 14

SOURCE-MULTIPLEXED PULSE AMPLITUDE MODULATION (PAM) OPTICAL DATA COMMUNICATION SYSTEM AND METHOD

BACKGROUND

An optical data communication system can comprise one or more opto-electronic (light) sources that can be modulated at the data transmission rate, an optical transmission medium such as optical fiber, and one or more opto-electronic receivers that can demodulate the optical signals to recover the data. For high-speed optical data communication, the opto-electronic sources are commonly semiconductor lasers, such as vertical cavity surface-emitting lasers. Such lasers are preferred over other light sources, such as light-emitting diodes, because lasers are capable of operating at high power to achieve high bit rates. The optical fibers in high-speed, long-distance optical data communication systems are typically made of glass rather than an alternative optically transparent material such as plastic, because glass optical fiber exhibits low signal attenuation and low mode dispersion. A glass optical fiber typically has a core diameter between about 10 and 200 micrometers (μm). A plastic optical fiber typically has a core diameter between 500 μm and 1 millimeter (mm). Accordingly, although plastic optical fiber is economical and easy to install, glass optical fiber is much more commonly used in optical data communication systems than plastic optical fiber.

Pulse amplitude modulation (PAM) is a form of signal modulation in which the communicated information is encoded in the amplitude of a series of signal pulses. For example, in the PAM nomenclature, PAM4 refers to a technique in which the communicated information is processed in two-bit groups, where each group is mapped to one of four possible signal amplitude levels.

SUMMARY

Embodiments of the present invention relate to a transmitter and method for transmitting an optical signal through an optical fiber coupled to a semiconductor device having a group of three or more opto-electronic light sources that emit optical signals in accordance with a pulse amplitude modulation (PAM) scheme.

In an illustrative or exemplary embodiment, such a transmitter can include a body assembly having a coupling that can be mated with an end of the optical fiber. The diameter of the circular region or effective radiation area from which the group of three or more opto-electronic light sources emits the optical signals is less than the diameter of the end of the optical fiber coupled to the body assembly.

A PAM encoder can encode a digital data stream into at least three pulse amplitude-modulated outputs, each having two or more amplitude states. Each pulse amplitude-modulated output can control a corresponding one of the opto-electronic light sources. In accordance with the PAM scheme, the collective amplitude of the pulse amplitude-modulated outputs represents a symbol in a symbol set, i.e., one of a set of two or more unique symbols. Each symbol encodes groups of two or more data bits of the digital data stream.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
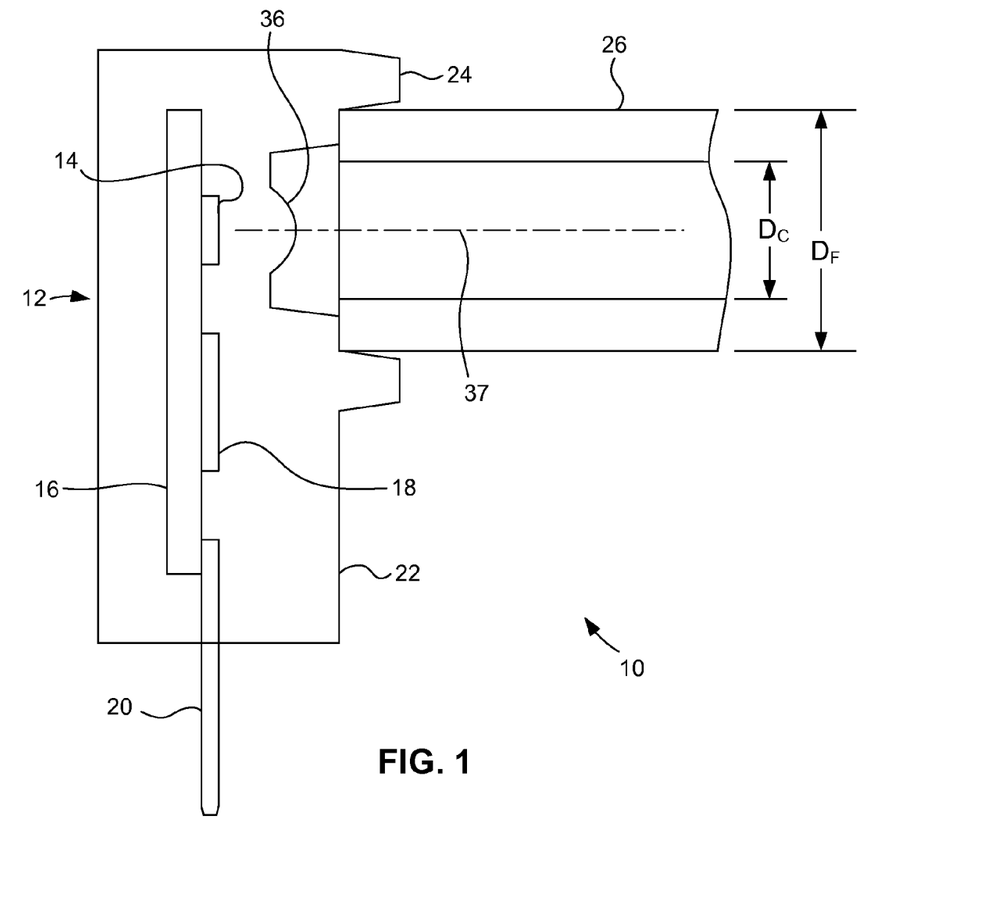
FIG. 1 is a side elevation view of an opto-electronic transmitter coupled to an optical fiber, in accordance with an exemplary embodiment of the invention.
Figure 2:
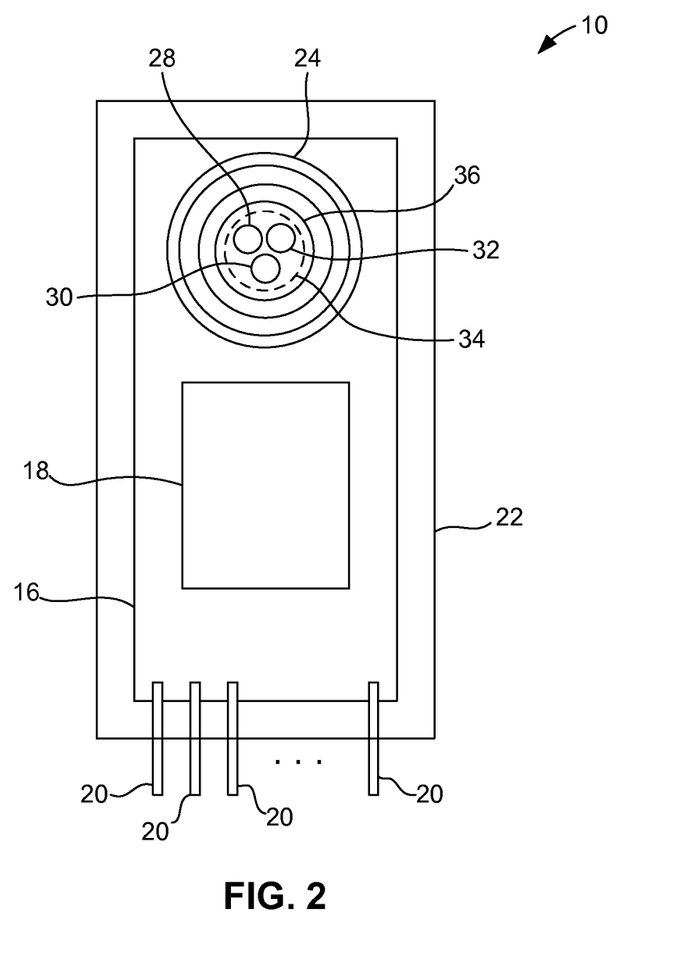
FIG. 2 is a front elevation view of the transmitter of FIG. 1.

As illustrated in FIGS. 1-2, in an illustrative or exemplary embodiment of the invention, an opto-electronic transmitter 10 includes a body assembly 12, an opto-electronic semiconductor device 14 mounted on a lead frame 16 of body assembly 12, and an integrated circuit device 18 also mounted on lead frame 16. Integrated circuit device 18 performs pulse amplitude modulation (PAM) of an input digital data stream that it receives via one or more of the electrical contact pins 20 and drives opto-electronic semiconductor device 14 with the resulting pulse amplitude-modulated outputs, as described below in further detail. Body assembly 12 further includes a package or body 22. Body 22 can be made of molded plastic material that is transparent to the optical signals emitted by opto-electronic semiconductor device 14 (and shown in FIGS. 1-2 as transparent to visible light for convenience of illustration). In the exemplary embodiment, body 22 thus encapsulates lead frame 16, opto-electronic semiconductor device 14, integrated circuit device 18, and portions of contact pins 20.

Body 22 has an optical fiber coupling ring 24 that can receive the end of an optical fiber 26. In the exemplary embodiment, optical fiber 26 is a plastic optical fiber, which, as well understood by persons skilled in the art, is not only made of a plastic material rather than, for example, glass, but also typically has a core diameter between 500 μm and 1 mm, which is significantly larger than the core diameter of a glass optical fiber. For example, optical fiber 26 can have a core diameter ($D_C$) of 980 μm and a total fiber diameter ($D_F$), i.e., core plus outer layers (i.e., cladding, buffer, outer coating, etc.) of 2.2 mm. It is also well known that plastic optical fiber typically has a numerical aperture (NA) that is greater than that of glass optical fiber. For example, optical fiber 26 can have a numerical aperture of 0.5.

In the embodiment illustrated in FIGS. 1-2, opto-electronic semiconductor device 14 includes three light-emitting diodes (LEDs) 28, 30 and 32 (FIG. 2) that are monolithically formed, i.e., on a common semiconductor substrate, so that they are very close together. For example, in this embodiment, each of LEDs 28, and 32 can have a spot size or diameter of about 80 µm and can be spaced closely enough together to provide an effective radiation area or emitting region 34 having a diameter of about 170 µm. The center of emitting region 34 can define an optical axis 37 (FIG. 1) along which the optical signals emitted by opto-electronic semiconductor device 14 are substantially directed (i.e., but for inherent beam spreading). LEDs 28, 30 and 32 can be arranged symmetrically about optical axis 37. Coupling ring 24 surrounds emitting region 34 and is aligned coaxially with optical axis 37. Note that the diameter of emitting region 34 is less than the core diameter of optical fiber 26, thus enabling the optical signals emitted by LEDs 28, 30 and 32 to be directed into the end of optical fiber 26, where the amplitudes of these optical signals combine with each other to define a collective optical signal having a collective amplitude. It should also be noted that the relatively large diameter of the core of optical fiber 26 and the relatively large numerical aperture of optical fiber 26 promote coupling of optical power from LEDs 28, 30 and 32 into the end of optical fiber 26.

In the embodiment shown in FIGS. 1-2, body 22 includes a lens 36. Lens 36 can be unitarily formed with body 22, i.e., as a feature of a unitarily molded part. Note that lens 36 is aligned with optical axis 37 between LEDs 28, 30 and 32 and the end of optical fiber 26. Also note that the diameter of emitting region 34 is less than the diameter of lens 36 so that lens 36 can collimate the light emitted by LEDs 28, 30 and 32.

Figure 3:
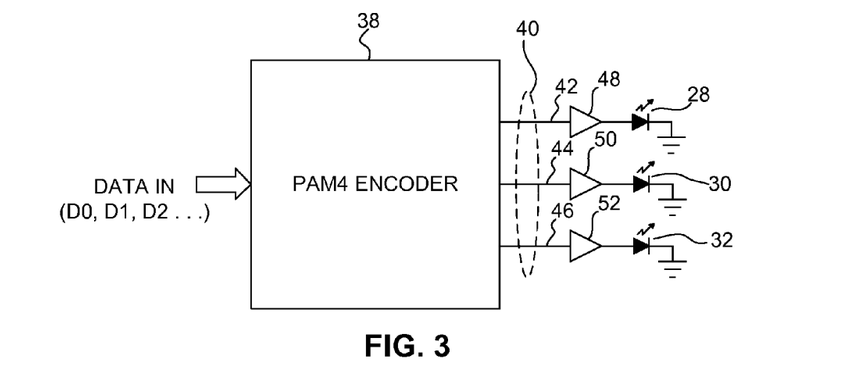
FIG. 3 is a block diagram of the transmitter of FIG. 1.
Figure 4:
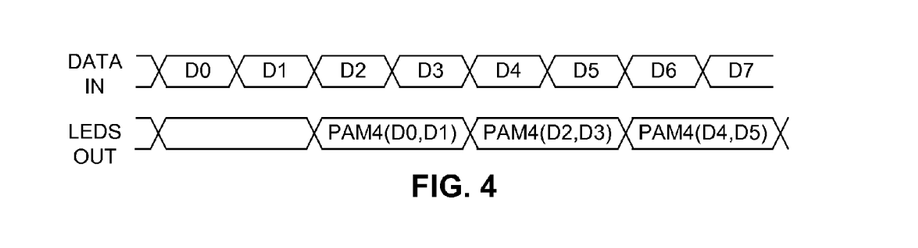
FIG. 4 is a timing diagram illustrating an aspect of a method of operation of the transmitter of FIG. 1.
Figure 5:
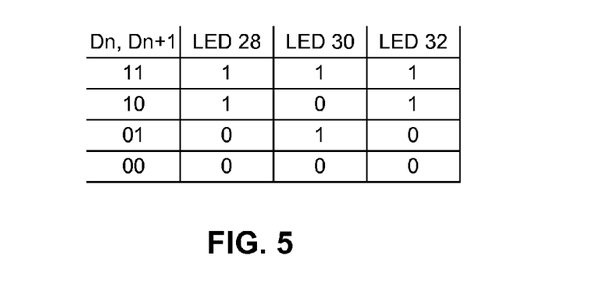
FIG. 5 is a logic table illustrating the encoding in a method of operation of the transmitter of FIG. 1.

As illustrated in FIGS. 3-5, a PAM4 encoder 38 (FIG. 3) receives and processes a digital data stream. Although the term "data stream" is used herein because the digital data is received in a time-varying manner, the data bits (D0, D1, D2, etc.) of the digital data stream can be received serially, in parallel words, or in any other suitable manner. Also, although for purposes of illustration the received data bits are referred to herein as D0, D1, D2, etc., the data bits can be received and processed in any suitable order or groupings. In the exemplary embodiment illustrated in FIGS. 1-5, PAM4 encoder 38 processes the received data bits in groups of two data bits, bit $D_n$ and bit $D_{n+1}$. Thus, for example, as illustrated in FIGS. 3-4: PAM 4 encoder 38 receives and encodes data bits D0 and D1 as a first group, producing an encoded output 40 (FIG. 3) represented as "PAM4(D0,D1)" in FIG. 4; receives and encodes data bits D2 and D3 as a second group, producing an encoded output 40 (FIG. 3) represented as "PAM4(D2,D3)" in FIG. 4; receives and encodes data bits D4 and D5 as a third group, producing an encoded output 40 (FIG. 3) represented as "PAM4(D4,D5)" in FIG. 4; etc. In the embodiment illustrated in FIGS. 1-5, encoded output 40 comprises three pulse amplitude-modulated outputs 42, 44 and 46. That is, as a result of encoding each group of two data bits, PAM4 encoder 38 produces three pulse amplitude-modulated outputs 42, 44 and 46.

Driver circuits 48, 50 and 52 drive LEDs 28, 30 and 32 in response to pulse amplitude-modulated outputs 42, 44 and 46, respectively. That is, pulse amplitude-modulated output 42, is coupled to LED 28 via driver circuit 48; pulse amplitude-modulated output 44, is coupled to LED 30 via driver circuit 50; and pulse amplitude-modulated output 46, is coupled to LED 32 via driver circuit 52. Importantly, LEDs 28, 30 and 32 are not tied together or otherwise operated in unison. Rather, as described below in further detail, pulse amplitude-modulated outputs 42, 44 and 46 are used, in essence, to multiplex LEDs 28, 30 and 32, so that at any given time some of LEDs 28, 30 and 32 are turned on in a first amplitude state and others are turned off or otherwise in a second amplitude state.

The PAM4 encoder 38 and driver circuits 48, 50 and 52 can be included in integrated circuit device 18 (FIGS. 1-2). Although not shown for purposes of clarity, lead frame 16 includes conductors that carry electrical signals among contact pins 20, integrated circuit device 18 and opto-electronic semiconductor device 14.

In the embodiment illustrated in FIGS. 1-5, each of pulse amplitude-modulated outputs 42, 44 and 46 has two amplitude states, which can be referred to as "0" and "1". For example, amplitude state "1" can correspond to an amplitude (level) of the light emitted by one of LEDs 28, 30 and 32 when driven with a current I, while amplitude state "0" can represent the zero amplitude of one of LEDs 28, 30 and 32 when a current of zero is applied.

As illustrated by the table of FIG. 5, PAM4 encoder 38 encodes a group of two data bits $D_n$ and $D_{n+1}$ having values of "0" and "0", respectively, as a symbol 000. Symbol 000 corresponds to a state in which pulse amplitude-modulated output 42 has an amplitude state of "0", pulse amplitude-modulated output 44 has an amplitude state of "0", and pulse amplitude-modulated output 46 has an amplitude state of "0". As further illustrated by the table of FIG. 5, PAM4 encoder 38 encodes a group of two data bits $D_n$ and $D_{n+1}$ having values of "0" and "1", respectively, as a symbol 010. Symbol 010 corresponds to a state in which pulse amplitude-modulated output 42 has an amplitude state of "0", pulse amplitude-modulated output 44 has an amplitude state of "1", and pulse amplitude-modulated output 46 has an amplitude state of "0". As further illustrated by the table of FIG. 5, PAM4 encoder 38 encodes a group of two data bits $D_n$ and $D_{n+1}$ having values of "1" and "0", respectively, as a symbol 101. Symbol 101 corresponds to a state in which pulse amplitude-modulated output 42 has an amplitude state of "1", pulse amplitude-modulated output 44 has an amplitude state of 0, and pulse amplitude-modulated output 46 has an amplitude state of "1". As further illustrated by the table of FIG. 5, PAM4 encoder 38 encodes a group of two data bits $D_n$ and $D_{n+1}$ having values of "1" and "1", respectively, as a symbol 111. Symbol 111 corresponds to a state in which pulse amplitude-modulated output 42 has an amplitude state of "1", pulse amplitude-modulated output 44 has an amplitude state of "1", and pulse amplitude-modulated output 46 has an amplitude state of "1".

Note that the sum of the amplitude states of pulse amplitude-modulated outputs 42, 44 and 48 (i.e., the collective amplitude) represents one of four unique symbols in a symbol set: 000, 010, 101 and 111. That is, the sum of the amplitude states in the symbol 000 is zero; the sum of the amplitude states in the symbol 010 is one; the sum of the amplitude states in the symbol 101 is two; and the sum of the amplitude states in the symbol 111 is three. Accordingly, when LEDs 28, 30 and 32 are driven in response to pulse amplitude-modulated outputs 42, 44 and 46, LEDs 28, 30 and 32 emit optical signals having a combined or collective amplitude that uniquely corresponds to the two encoded data bits. For example, in response to two data bits $D_n$ and $D_{n+1}$ having values of "1" and "0", respectively, LEDs 28, 30 and 32 emit optical signals having a collective amplitude that is twice the collective amplitude of the optical signals emitted by LEDs 28, 30 and 32 in response to two other data bits $D_n$ and $D_{n+1}$ having values "0" and "1", respectively. Similarly, in response to two data bits $D_n$ and $D_{n+1}$ having values of "1" and "1", respectively, LEDs 28, 30 and 32 emit optical signals having a collective amplitude that is three times the collective amplitude of the optical signals emitted by LEDs 28, 30 and 32 in response to two other data bits $D_n$ and $D_{n+1}$ having values "0" and "1", respectively.

Note that at least one symbol in the symbol set is represented by at least two pulse amplitude-modulated outputs 42, 44 and 46 having different amplitude states from each other. That is, the symbol set consists of more symbols than just 000 and 111, which correspond to either all of LEDs 28, 30 and 32 being "off" or all of LEDs 28, 30 and 32 being "on," respectively. For example, the symbol set also includes the symbol 010, which is represented by the pulse amplitude-modulated output 50 having an amplitude state of "1", which is different from the other two pulse amplitude-modulated outputs 48 and 52, which have an amplitude state of "0". Thus, LEDs 28, 30 and 32 are not tied together or otherwise operated in unison. Rather, LEDs 28, 30 and 32 are effectively used in a multiplexed manner, such that at any given time some of LEDs 28, 30 and 32 are turned "on" in a first amplitude state and others are turned "off" or otherwise in a second amplitude state.

It should also be noted that the table of FIG. 5 is arranged to substantially evenly apportion the current loading of LEDs 28, 30 and 32. That is, based on a presumption that all of the four groups of two data bits set forth in the table are equally likely to occur, each of LEDs 28, 30 and 32 is turned "on" (i.e., an amplitude state of 1) for two of the four groups and "off" (i.e., an amplitude state of 0) for two of the four groups.

Figure 6:
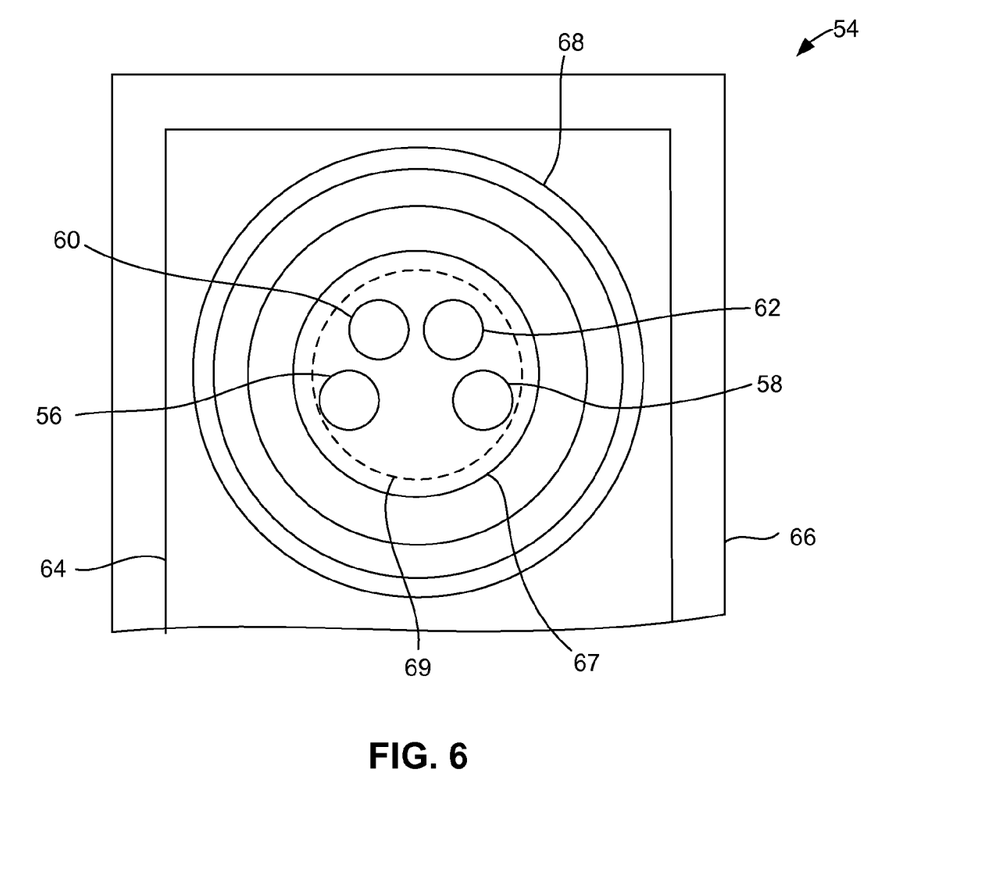
FIG. 6 is a front elevation view of a transmitter, in accordance with another exemplary embodiment of the invention.

As illustrated in FIG. 6, in another illustrative or exemplary embodiment of the invention, an opto-electronic transmitter 54 includes four LEDs 56, 58, 60 and 62. Other than having a different number of LEDs and employing a different PAM encoding scheme, opto-electronic transmitter 54 is similar to opto-electronic transmitter 10, described above with regard to FIGS. 1-5. Accordingly, in opto-electronic transmitter 54, LEDs 56, 58, 60 and 62 are monolithically formed in an opto-electronic semiconductor device mounted on a lead frame 64 of a body assembly. As LEDs 56, 58, 60 and 62 are formed together on a common semiconductor substrate, they can be spaced very close together. For example, in this embodiment, each of LEDs 56, 58, 60 and 62 can have a spot size of about 80 μm and can be spaced closely enough together to provide an effective radiation area or emitting region 69 having a diameter of about 450 μm. Although not shown for purposes of clarity, an integrated circuit device and electrical contact pins are also included in the body assembly and mounted to lead frame 64 in the same manner as described above with regard to the embodiment illustrated in FIGS. 1-5. A body 66, which can be made of a transparent plastic material, encapsulates the semiconductor device, lead frame 64 and portions of the contact pins in the same manner as described above with regard to the embodiment illustrated in FIGS. 1-5. Body 66 has a lens 67 and an optical fiber coupling ring 68 that can receive the end of an optical fiber (not shown) similar to above-described optical fiber 26. Note that, as in the embodiment described above with regard to FIGS. 1-5, the diameter of emitting region 69 in this embodiment is less than the diameter of the optical fiber core.

Figure 7:
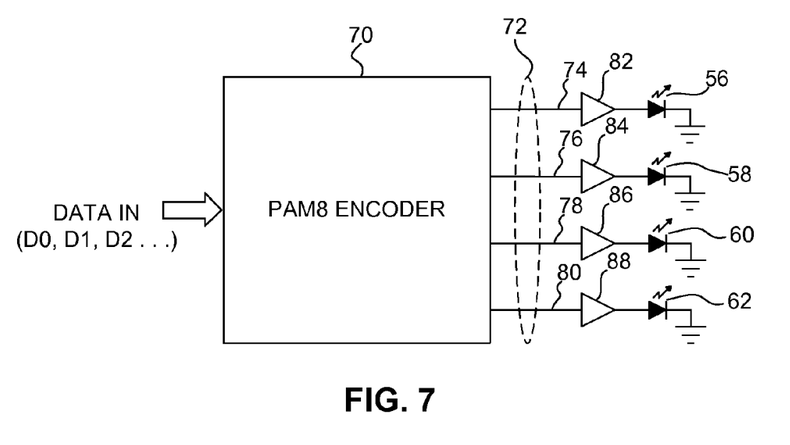
FIG. 7 is a block diagram of the transmitter of FIG. 6.
Figure 8:
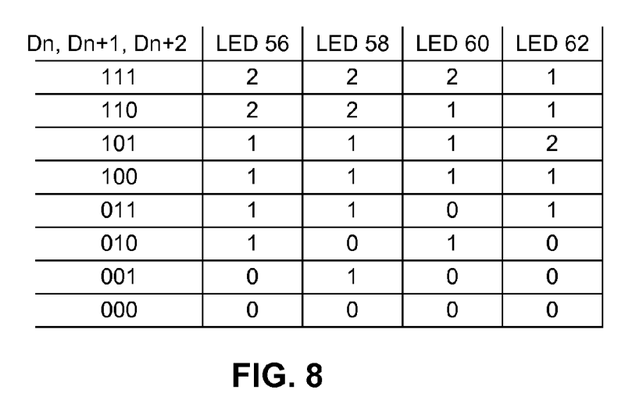
FIG. 8 is a logic table illustrating the encoding in a method of operation of the transmitter of FIG. 6.

As illustrated in FIGS. 7-8, a PAM8 encoder 70 receives and processes a digital data stream. In this embodiment, PAM8 encoder 70 processes the received data bits in groups of three data bits, $D_n$, $D_{n+1}$ and $D_{n+2}$. That is, PAM8 encoder 70 receives each group of three data bits $D_n$, $D_{n+1}$ and $D_{n+2}$ and encodes them as an encoded output 72 comprising four pulse amplitude-modulated outputs 74, 76, 78 and 80.

Driver circuits 82, 84, 86 and 88 drive LEDs 56, 58, 60 and 62 in response to pulse amplitude-modulated outputs 74, 76, 78 and 80, respectively. That is, pulse amplitude-modulated output 74, is coupled to LED 56 via driver circuit 82; pulse amplitude-modulated output 76, is coupled to LED 58 via driver circuit 84; pulse amplitude-modulated output 78, is coupled to LED 60 via driver circuit 86; and amplitude-modulated output 80, is coupled to LED 62 via driver circuit 88. The PAM8 encoder 70 and driver circuits 82, 84, 86 and 88 can be included in the integrated circuit device. Although not shown for purposes of clarity, lead frame 64 includes conductors that carry electrical signals among the contact pins, integrated circuit device, and opto-electronic semiconductor device. The LEDs 56, 58, 60 and 62 are not symmetrically arranged (see FIG. 6) around an optical axis in the center of emitting region 69 due to signal routing and timing considerations with respect to the electrical conductors (not shown) that feed LEDs 56, 58, 60 and 62.

In the embodiment illustrated in FIGS. 6-8, each of pulse amplitude-modulated outputs 74, 76, 78 and 80 has three amplitude states, which can be referred to as "0", "1" and "2". For example, amplitude state "1" can correspond to the amplitude (level) of the light emitted by one of LEDs 56, 58, 60 and 62 when driven with a current I, while amplitude state "2" can correspond to the amplitude (level) of the light emitted by one of LEDs 56, 58, 60 and 62 when driven with a current 2I relative to the current level I (i.e., twice the current level I), and the amplitude state "0" can correspond to the amplitude (level) when one of LEDs 56, 58, 60 and 62 is driven with zero current, i.e., when turned "off."

As illustrated by the table of FIG. 8, PAM8 encoder 70 encodes a group of three data bits $D_n$, $D_{n+1}$ and $D_{n+2}$ in a manner similar to the manner described above with regard to embodiment illustrated in FIGS. 1-5. For example, PAM8 encoder 70 encodes a group of three data bits $D_n$, $D_{n+1}$ and $D_{n+2}$ having values of 010, respectively, as a symbol 1010. Symbol 1010 corresponds to a state in which pulse amplitude-modulated output 74 has an amplitude state of "1", pulse amplitude-modulated output 76 has an amplitude state of "0", pulse amplitude-modulated output 78 has an amplitude state of "1", and pulse amplitude-modulated output 80 has an amplitude state of "0".

Note that the sum of the amplitude states of pulse amplitude-modulated outputs 74, 76, 78 and 80 (i.e., the collective amplitude) represents one of eight unique symbols in a symbol set: 0000, 0100, 1010, 1101, 1111, 1112, 2211 and 2221. That is, the sum of the amplitude states in the symbol 0000 is zero; the sum of the amplitude states in the symbol 0100 is one; the sum of the amplitude states in the symbol 1010 is two; the sum of the amplitude states in the symbol 1101 is three; the sum of the amplitude states in the symbol 1111 is four; the sum of the amplitude states in the symbol 1112 is five; the sum of the amplitude states in the symbol 2211 is six; and the sum of the amplitude states in the symbol 2221 is seven. Accordingly, when LEDs 56, 58, 60 and 62 are driven in response to pulse amplitude-modulated outputs 74, 76, 78 and 80, LEDs 56, 58, 60 and 62 emit optical signals having a combined or collective amplitude that uniquely corresponds to the three encoded data bits.

Note that at least one symbol in the symbol set is represented by at least two pulse amplitude-modulated outputs 74, 76, 78 and 80 having different amplitude states from each other. That is, the symbol set does not consist solely of symbols such as 0000, 1111, 2222, etc., which would correspond to LEDs 56, 58, 60 and 62 emitting light of the same amplitude as each other regardless of the data bits. (Although there is no symbol 2222 in this embodiment, such a symbol could be included.) In other words, LEDs 56, 58, 60 and 62 are not tied together or otherwise operated in unison but rather driven in a multiplexed manner.

It should also be noted that the table of FIG. 8 is arranged to substantially evenly apportion the current loading of LEDs 56, 58, 60 and 62. That is, based on a presumption that all of the eight groups of three data bits set forth in the table are equally likely to occur: LED 56 is turned "on" (i.e., an amplitude state of "1" or "2") for six of the eight groups, and turned "off" (i.e., an amplitude state of "0") for two of the eight groups; LED 58 is turned "on" for six of the eight groups, and turned "off" for two of the eight groups; LED 60 is turned on for five of the eight groups, and turned "off" for three of the eight groups; and LED 62 is turned "on" for five of the eight groups, and turned "off" for three of the eight groups.

Figure 9:
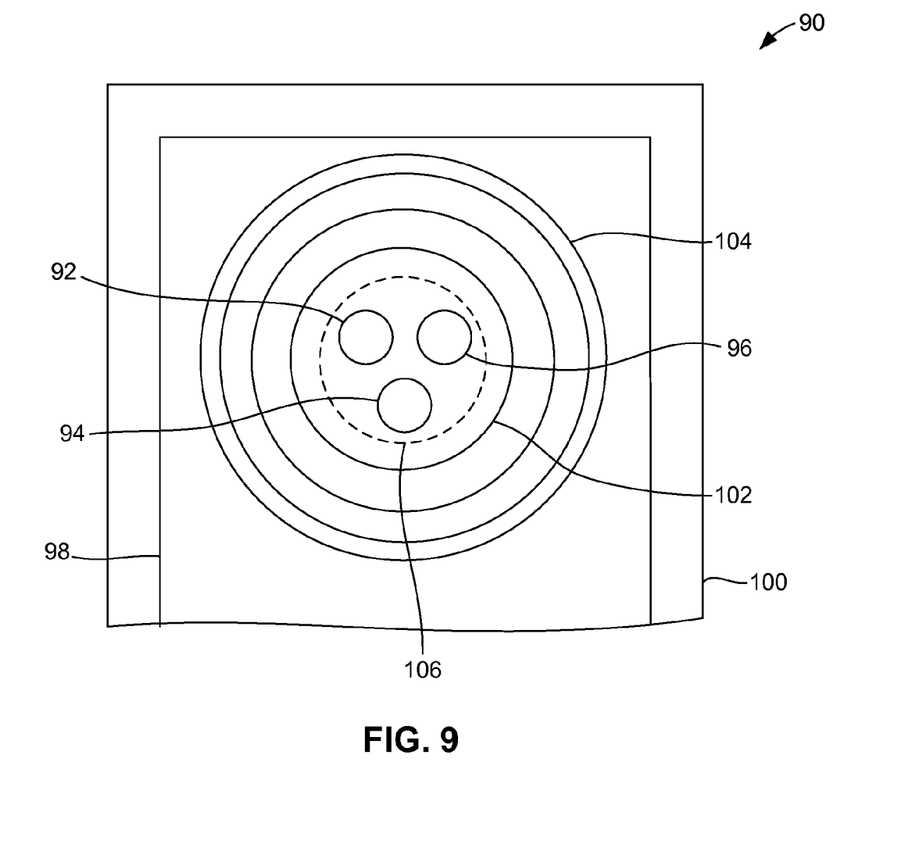
FIG. 9 is a front elevation view of a transmitter, in accordance with yet another exemplary embodiment of the invention.

As illustrated in FIG. 9, in yet another illustrative or exemplary embodiment of the invention, an opto-electronic transmitter 90 includes three LEDs 92, 94, 96. Other than employing a different PAM encoding scheme, opto-electronic transmitter 90 is similar to opto-electronic transmitter 10 described above with regard to FIGS. 1-5. Accordingly, in opto-electronic transmitter 90, LEDs 92, 94 and 96 are monolithically formed in an opto-electronic semiconductor device mounted on a lead frame 98 of a body assembly. As LEDs 92, 94 and 96 are formed together on a common semiconductor substrate, they can be spaced very closely together. For example, in this embodiment, each of LEDs 92, 94 and 96 can have a spot size of about 80 μm and can be spaced closely enough together to provide an effective radiation area or emitting region 106 having a diameter of about 170 μm. Although not shown for purposes of clarity, an integrated circuit device and electrical contact pins are also included in the body assembly and mounted to lead frame 98. A body 100, made of a transparent plastic material, encapsulates the semiconductor device, lead frame 98 and portions of the contact pins in the same manner described above with regard to FIGS. 1-5. Body 100 has a lens 102 and an optical fiber coupling ring 104 that can receive the end of an optical fiber (not shown) similar to optical fiber 26 described above with regard to FIGS. 1-2. Note that, as in the other embodiments described above, the diameter of emitting region 106 in this embodiment is less than the diameter of the optical fiber core.

Figure 10:
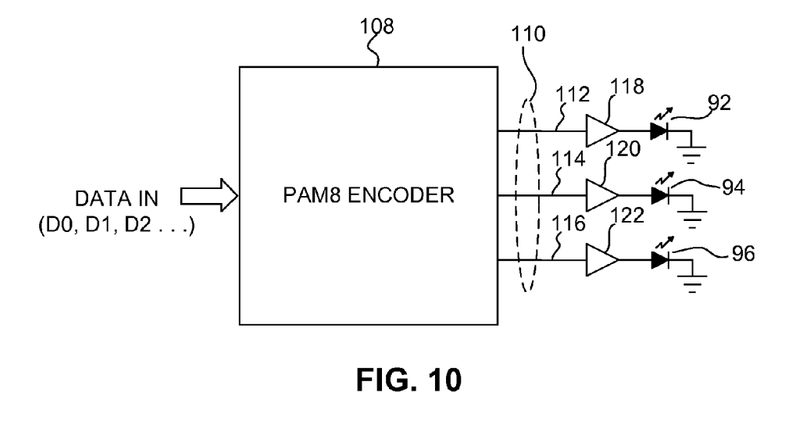
FIG. 10 is a block diagram of the transmitter of FIG. 9.
Figure 11:
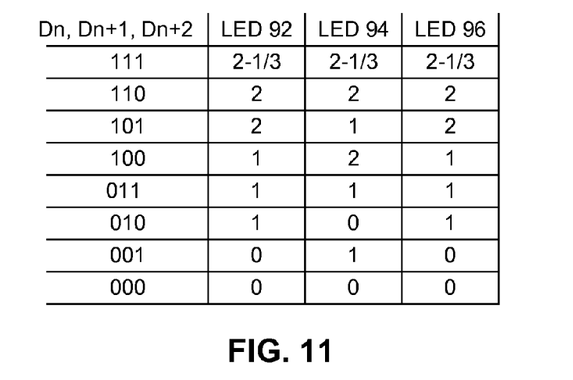
FIG. 11 is a logic table illustrating the encoding in a method of operation of the transmitter of FIG. 9.

As illustrated in FIGS. 10-11, a PAM8 encoder 108 receives and processes a digital data stream. In this embodiment, PAM8 encoder 108 processes the received data bits in groups of three data bits, $D_n$, $D_{n+1}$ and $D_{n+2}$. That is, PAM8 encoder 108 receives each group of three data bits $D_n$, $D_{n+1}$ and $D_{n+2}$ and encodes them as an encoded output 110 comprising three pulse amplitude-modulated outputs 112, 114 and 116.

Driver circuits 118, 120 and 122 drive LEDs 92, 94 and 96 in response to pulse amplitude-modulated outputs 112, 114 and 116, respectively. That is, pulse amplitude-modulated output 112 is coupled to LED 92 via driver circuit 118; pulse amplitude-modulated output 114 is coupled to LED 94 via driver circuit 120; and pulse amplitude-modulated output 116 is coupled to LED 96 via driver circuit 122. The PAM8 encoder 108 and driver circuits 118, 120 and 122 can be included in the integrated circuit device. Although not shown for purposes of clarity, lead frame 98 includes conductors that carry electrical signals among the contact pins, integrated circuit device, and opto-electronic semiconductor device.

In the embodiment illustrated in FIGS. 9-11, each of pulse amplitude-modulated outputs 112, 114 and 116 has four amplitude states, which can be referred to as "0", "1", "2" and "2⅓". For example, amplitude state "1" can correspond to an amplitude (level) of the light emitted by one of LEDs 92, 94 and 96 when driven with a current I; amplitude state "2" can correspond to an amplitude (level) of the light emitted by one of LEDs 92, 94 and 96 when driven with a current 2I relative to the current level I (i.e., twice the current level I); amplitude state "2⅓" can correspond to an amplitude (level) of the light emitted by one of LEDs 92, 94 and 96 when driven with a current that is two and one-third times the current level I; and amplitude state "0" can represent the amplitude (level) when one of LEDs 92, 94 and 96 is driven with a zero current, i.e., when turned "off."

As illustrated by the table of FIG. 11, PAM8 encoder 108 encodes a group of three data bits $D_n$, $D_{n+1}$ and $D_{n+2}$ in a manner similar to the manner described above with regard to embodiment illustrated in FIGS. 6-8. For example, PAM8 encoder 108 encodes a group of three data bits $D_n$, $D_{n+1}$ and $D_{n+2}$ having values of 010, respectively, as a symbol 101. Symbol 101 corresponds to a state in which pulse amplitude-modulated output 112 has an amplitude state of "1", pulse amplitude-modulated output 114 has an amplitude state of "0", and pulse amplitude-modulated output 116 has an amplitude state of "1". Similarly, PAM8 encoder 108 encodes a group of three data bits $D_n$, $D_{n+1}$ and $D_{n+2}$ having values of 111, respectively, as a symbol (2⅓, 2⅓, 2⅓). Symbol (2⅓, 2⅓, 2⅓) corresponds to a state in which pulse amplitude-modulated output 112 has an amplitude state of "2⅓," pulse amplitude-modulated output 114 has an amplitude state of "2⅓," and pulse amplitude-modulated output 116 has an amplitude state of "2⅓".

Note that the sum of the amplitude states of pulse amplitude-modulated outputs 112, 114 and 116 (i.e., the collective amplitude) represents one of eight unique symbols in a symbol set: 000, 010, 101, 111, 121, 212, 222 and (2⅓, 2⅓, 2⅓). That is, the sum of the amplitude states in the symbol 000 is zero; the sum of the amplitude states in the symbol 010 is one; the sum of the amplitude states in the symbol 101 is two; the sum of the amplitude states in the symbol 111 is three; the sum of the amplitude states in the symbol 121 is four; the sum of the amplitude states in the symbol 212 is five; the sum of the amplitude states in the symbol 222 is six; and the sum of the amplitude states in the symbol (2⅓, 2⅓, 2⅓) is seven. Accordingly, when LEDs 92, 94 and 96 are driven in response to pulse amplitude-modulated outputs 112, 114 and 116, LEDs 92, 94 and 96 emit optical signals having a combined or collective amplitude that uniquely corresponds to the three encoded data bits.

Note that at least one symbol in the symbol set is represented by at least two pulse amplitude-modulated outputs 112, 114 and 116 having different amplitude states from each other. That is, the symbol set does not consist solely of symbols such as 000, 111, 222, (2⅓, 2⅓, 2⅓), etc. which would correspond to LEDs 92, 94 and 96 emitting light of the same amplitude as each other regardless of the data bits. In other words, LEDs 92, 94 and 96 are not tied together or otherwise operated in unison but rather driven in a multiplexed manner.

It should also be noted that the table of FIG. 11 is arranged to substantially evenly apportion the current loading of LEDs 92, 94 and 96. That is, based on a presumption that all of the eight groups of three data bits set forth in the table are equally likely to occur, each of LEDs 92, 94 and 96 is turned "on" (i.e., an amplitude state of "1", "2" or "2⅓") for six of the eight groups and "off" (i.e., an amplitude state of "0") for two of the eight groups.

Figure 12:
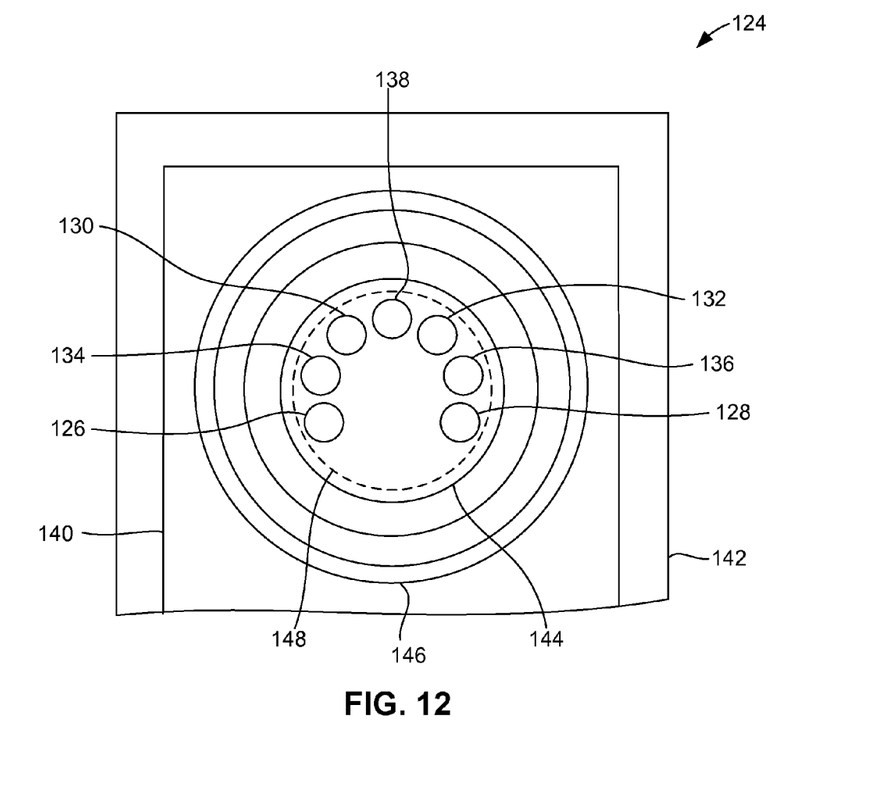
FIG. 12 is a front elevation view of a transmitter, in accordance with still another exemplary embodiment of the invention.

Many other embodiments are also possible. For example, as illustrated in FIG. 12, in yet another illustrative or exemplary embodiment of the invention, an opto-electronic transmitter 124 includes seven LEDs 126, 128, 130, 132, 134, 136 and 138. Other than employing a different number of LEDs and different PAM encoding scheme, opto-electronic transmitter 124 is similar to opto-electronic transmitters 10, 54 and 90 described above. Accordingly, in opto-electronic transmitter 124, LEDs 126, 128, 130, 132, 134, 136 and 138 are monolithically formed in an opto-electronic semiconductor device mounted on a lead frame 140 of a body assembly. As LEDs 126, 128, 130, 132, 134, 136 and 138 are formed together on a common semiconductor substrate, they can be spaced very closely together. For example, in this embodiment, each of LEDs 126, 128, 130, 132, 134, 136 and 138 can have a spot size of about 80 μm and can be spaced closely enough together to provide an effective radiation area or emitting region 148 having a diameter of about 580 μm. Although not shown for purposes of clarity, an integrated circuit device and electrical contact pins are also included in the body assembly and mounted to lead frame 140. A body 142, made of a transparent plastic material, encapsulates the semiconductor device, lead frame 140 and portions of the contact pins in the same manner described above with regard to other embodiments. Body 142 has a lens 144 and an optical fiber coupling ring 146 that can receive the end of an optical fiber (not shown) similar to optical fiber 26 described above with regard to FIGS. 1-2. Note that, as in the other embodiments described above, the diameter of emitting region 148 in this embodiment is less than the diameter of the optical fiber core.

Figure 13:
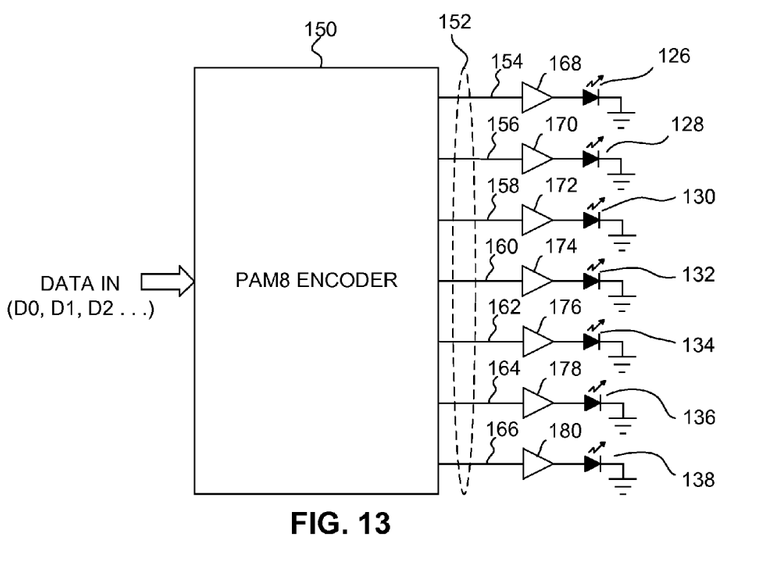
FIG. 13 is a block diagram of the transmitter of FIG. 12
Figure 14:
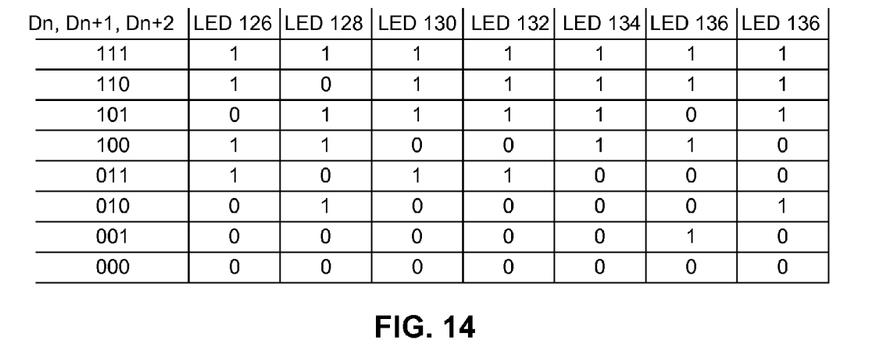
FIG. 14 is a logic table illustrating the encoding in a method of operation of the transmitter of FIG. 12.

As illustrated in FIGS. 13-14, a PAM8 encoder 150 receives and processes a digital data stream. In this embodiment, PAM8 encoder 150 processes the received data bits in groups of three data bits, $D_n$, $D_{n+1}$ and $D_{n+2}$. That is, PAM8 encoder 150 receives each group of three data bits $D_n$, $D_{n+1}$ and $D_{n+2}$ and encodes them as an encoded output 152 comprising seven pulse amplitude-modulated outputs 154, 156, 158, 160, 162, 164 and 166.

Driver circuits 168, 170, 172, 174, 176, 178 and 180 drive LEDs 126, 128, 130, 132, 134, 136 and 138 in response to pulse amplitude-modulated outputs 154, 156, 158, 160, 162, 164 and 166, respectively. As in the other embodiments described above, PAM8 encoder 150 and driver circuits 168, 170, 172, 174, 176, 178 and 180 can be included in the integrated circuit device. Although not shown for purposes of clarity, lead frame 140 includes conductors that carry electrical signals among the contact pins, integrated circuit device, and opto-electronic semiconductor device. The LEDs 126, 128, 130, 132, 134, 136 and 138 are not symmetrically arranged (see FIG. 12) around an optical axis in the center of emitting region 148 due to signal routing and timing considerations with respect to the electrical conductors (not shown) that feed LEDs 126, 128, 130, 132, 134, 136 and 138.

As illustrated by the table of FIG. 14, in this embodiment each of pulse amplitude-modulated outputs 154, 156, 158, 160, 162, 164 and 166 has two amplitude states, "0" and "1". The PAM8 encoder 150 encodes a group of three data bits $D_n$, $D_{n+1}$ and $D_{n+2}$ in a manner similar to the manner described above with regard to other embodiments. Accordingly, the encoding in this embodiment is not described in similar detail.

In a manner similar to the above-described embodiments, in this embodiment the sum of the amplitude states of pulse amplitude-modulated outputs 154, 156, 158, 160, 162, 164 and 166 (i.e., the collective amplitude) represents one of eight unique symbols in a symbol set. Accordingly, when LEDs 126, 128, 130, 132, 134, 136 and 138 are driven in response to pulse amplitude-modulated outputs 154, 156, 158, 160, 162, 164 and 166, LEDs 126, 128, 130, 132, 134, 136 and 138 emit optical signals having a combined or collective amplitude that uniquely corresponds to the three encoded data bits.

It should also be noted that the table of FIG. 14 is arranged to substantially evenly apportion the current loading of LEDs 126, 128, 130, 132, 134, 136 and 138. That is, based on a presumption that all of the eight groups of three data bits set forth in the table are equally likely to occur, each of LEDs 126, 128, 130, 132, 134, 136 and 138 is turned "on" (i.e., an amplitude state of "0" or "1") for four of the eight groups and "off" (i.e., an amplitude state of "0") for four of the eight groups.

As illustrated by the above-described embodiments, employing PAM to multiplex a group of three or more opto-electronic light sources directly into the end of a single optical fiber can achieve high optical output power and correspondingly high bit rates, even in embodiments in which the light sources are relatively economical LEDs and even in embodiments in which the optical fiber is a relatively economical plastic optical fiber.

One or more illustrative or exemplary embodiments of the invention have been described above. However, it is to be understood that the invention is defined by the appended claims and is not limited to the specific embodiments described.

What is claimed is:

1. A transmitter for transmitting an optical signal through an optical fiber, comprising:
   an opto-electronic semiconductor device having at least three opto-electronic light sources disposed within a substantially circular emitting region and adapted to emit light substantially along an optical axis;
   a body assembly having an optical fiber coupling mateable with an end of the optical fiber, the opto-electronic semiconductor device mounted on a portion of the body assembly, the optical fiber coupling aligned with the optical axis and surrounding the circular emitting region, wherein a diameter of the circular emitting region is less than a diameter of the optical fiber; and
   a pulse amplitude modulation encoder, the pulse amplitude modulation encoder coupled to a source of a digital data stream and encoding the digital data stream into at least three pulse amplitude-modulated outputs, each pulse amplitude-modulated output having a plurality of amplitude states, a collective amplitude of the pulse amplitude-modulated outputs representing one of a plurality of unique symbols encoding a plurality of data bits of the digital data stream, at least one symbol of the plurality of unique symbols being represented by at least two pulse amplitude-modulated outputs having different amplitude states from each other, each of the pulse amplitude-modulated outputs coupled to a corresponding one of the at least three opto-electronic light sources.

2. The transmitter claimed in claim 1, wherein the at least three opto-electronic light sources are monolithically formed together on a semiconductor substrate.

3. The transmitter claimed in claim 1, wherein each of the at least three opto-electronic light sources is a light-emitting diode.

4. The transmitter claimed in claim 1, further comprising a lens disposed between the at least three opto-electronic light sources and the end of the optical fiber, wherein a diameter of the circular emitting region is less than a diameter of the lens.

5. The transmitter claimed in claim 1, wherein the optical fiber coupling is mateable with an end of an optical fiber having a core diameter greater than 500 micrometers.

6. The transmitter claimed in claim 1, wherein:
the at least three opto-electronic light sources consists of exactly three opto-electronic light sources; and
the pulse amplitude modulation encoder encodes successive groups of two data bits of the digital data stream into successive symbols represented by exactly three pulse amplitude-modulated outputs.

7. The transmitter claimed in claim 6, wherein each pulse amplitude-modulated output has exactly two amplitude states.

8. The transmitter claimed in claim 1, wherein:
the at least three opto-electronic opto-electronic light sources consists of at least three opto-electronic light sources consists of exactly three opto-electronic light sources; and
the pulse amplitude modulation encoder encodes successive groups of three data bits of the digital data stream into successive symbols represented by exactly three pulse amplitude-modulated outputs.

9. The transmitter claimed in claim 8, wherein each pulse amplitude-modulated output has exactly four amplitude states.

10. The transmitter claimed in claim 9, wherein the four amplitude states have values relative to one another of: 0, 1, 2 and 2⅓.

11. The transmitter claimed in claim 1, wherein:
the at least three opto-electronic light sources consists of exactly four opto-electronic light sources; and
the pulse amplitude modulation encoder encodes successive groups of three data bits of the digital data stream into successive symbols represented by exactly four pulse amplitude-modulated outputs.

12. The transmitter claimed in claim 11, wherein each pulse amplitude-modulated output has exactly three amplitude states.

13. The transmitter claimed in claim 12, wherein the three amplitude states have values relative to one another of: 0, 1 and 2.

14. A method for transmitting an optical signal through an optical fiber using an optical transmitting comprising an opto-electronic semiconductor device, a body assembly, and a pulse amplitude modulation encoder, the opto-electronic semiconductor device having at least three opto-electronic light sources disposed within a substantially circular emitting region and adapted to emit light substantially along an optical axis, the opto-electronic semiconductor device mounted on a portion of the body assembly, the method comprising:
coupling an optical fiber having a diameter greater than a diameter of the circular emitting region to the body assembly by mating an end of an optical fiber to an optical fiber coupling of the body assembly, wherein an end of the mated optical fiber is aligned with the optical axis and surrounding the circular emitting region;
coupling a source of a digital data stream to the pulse amplitude modulation encoder;
the pulse amplitude modulation encoder encoding the digital data stream into at least three pulse amplitude-modulated outputs, each pulse amplitude-modulated output having a plurality of amplitude states, a collective amplitude of the pulse amplitude-modulated outputs representing one of a plurality of unique symbols encoding a plurality of data bits of the digital data stream, at least one symbol of the plurality of unique symbols being represented by at least two pulse amplitude-modulated outputs having different amplitude states from each other; and
each of the at least three opto-electronic light sources emitting an optical signal in response to a corresponding one of the pulse amplitude-modulated outputs.

15. The method claimed in claim 14, wherein coupling an optical fiber having a diameter greater than a diameter of the circular emitting region to the body assembly comprises coupling a plastic optical fiber to the body assembly.

16. The method claimed in claim 14, wherein coupling an optical fiber having a diameter greater than a diameter of the circular emitting region to the body assembly comprises coupling an optical fiber having a core diameter greater than 500 micrometers to the body assembly.

17. The method claimed in claim 14, wherein the at least three opto-electronic light sources consists of exactly three opto-electronic light sources consists of exactly three opto-electronic opto-electronic light sources, and wherein the step of the pulse amplitude modulation encoder encoding the digital data stream into at least three pulse amplitude-modulated outputs comprises the pulse amplitude modulation encoder encoding successive groups of two data bits of the digital data stream into successive symbols represented by exactly three pulse amplitude-modulated outputs.

18. The method claimed in claim 17, wherein the step of encoding successive groups of two data bits of the digital data stream into successive symbols represented by exactly three pulse amplitude-modulated outputs comprises encoding into a pulse amplitude-modulated output having exactly two amplitude states.

19. The method claimed in claim 14, wherein the at least three opto-electronic light sources consists of exactly three opto-electronic light sources consists of exactly three opto-electronic opto-electronic light sources, and wherein the step of the pulse amplitude modulation encoder encoding the digital data stream into at least three pulse amplitude-modulated outputs comprises the pulse amplitude modulation encoder encoding successive groups of three data bits of the digital data stream into successive symbols represented by exactly three pulse amplitude-modulated outputs.

20. The method claimed in claim 19, wherein the step of encoding successive groups of three data bits of the digital data stream into successive symbols represented by exactly three pulse amplitude-modulated outputs comprises encoding into a pulse amplitude-modulated output having exactly four amplitude states.

21. The method claimed in claim 20, wherein the four amplitude states have values relative to one another of: 0, 1, 2 and 2⅓.

22. The method claimed in claim 14, wherein the at least three opto-electronic light sources consists of exactly four opto-electronic light sources consists of exactly four opto-electronic opto-electronic light sources, and wherein the step of the pulse amplitude modulation encoder encoding the digital data stream into at least three pulse amplitude-modulated outputs comprises the pulse amplitude modulation encoder encoding successive groups of three data bits of the digital data stream into successive symbols represented by exactly four pulse amplitude-modulated outputs.

23. The method claimed in claim 22, wherein the step of encoding successive groups of three data bits of the digital data stream into successive symbols represented by exactly four pulse amplitude-modulated outputs comprises encoding into a pulse amplitude-modulated output having exactly three amplitude states.

24. The method claimed in claim 23, wherein the three amplitude states have values relative to one another of: 0, 1 and 2.

* * * * *